United States Patent
Gandole et al.

(10) Patent No.: US 10,119,649 B2
(45) Date of Patent: *Nov. 6, 2018

(54) MULTI-FACETED APPLIANCE HEIGHT-ADJUSTMENT MECHANISM

(71) Applicant: WHIRLPOOL CORPORATION, Benton Harbor, MI (US)

(72) Inventors: Yogesh S. Gandole, Pune (IN); Naveen Jayabalan, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,905

(22) Filed: Oct. 24, 2017

(65) Prior Publication Data

US 2018/0045360 A1 Feb. 15, 2018

Related U.S. Application Data

(62) Division of application No. 14/617,400, filed on Feb. 9, 2015, now Pat. No. 9,835,284.

(51) Int. Cl.

| | |
|---|---|
| *F16M 11/24* | (2006.01) |
| *F16M 7/00* | (2006.01) |
| *A47L 15/42* | (2006.01) |
| *D06F 37/00* | (2006.01) |
| *F24C 15/08* | (2006.01) |
| *F25D 23/00* | (2006.01) |

(52) U.S. Cl.
CPC ............ *F16M 7/00* (2013.01); *A47L 15/4272* (2013.01); *D06F 37/00* (2013.01); *F24C 15/08* (2013.01); *F25D 23/00* (2013.01)

(58) Field of Classification Search
CPC ...... A47L 15/4272; D06F 37/00; F24C 15/08; F25D 23/00
USPC ...... 248/188.2, 188.8, 188.9, 188.91, 346.02, 248/346.5, 473, 488, 558, 615
See application file for complete search history.

(56) References Cited

U.S. PATENT DOCUMENTS

| | | |
|---|---|---|
| 2,281,769 A | 5/1942 | Hochriem |
| 2,750,709 A | 6/1956 | Saverino |
| 4,456,212 A | 6/1984 | Raftery |
| 4,549,765 A | 10/1985 | Hoch |
| 4,658,124 A | 4/1987 | Bertina |
| 5,058,881 A | 10/1991 | Measom |

(Continued)

*Primary Examiner* — Gwendolyn W Baxter
(74) *Attorney, Agent, or Firm* — Price Heneveld LLP

(57) ABSTRACT

An appliance height-adjustment mechanism includes a support block having a plurality of supporting faces, a plurality of height-adjustment surfaces defined by at least a portion of the supporting faces of the support block, each height-adjustment surface being further defined by a lateral spacing flange extending perpendicularly from each height-adjustment surface and a plurality of support surfaces defined by at least a portion of the plurality of supporting faces, wherein each support surface corresponds to a cooperating height-adjustment surface of the plurality of height-adjustment surfaces, wherein the support block includes a plurality of support positions, and wherein each of the plurality of support positions is defined by one of the support surfaces being a respective base of the support block and the corresponding height-adjustment surface defining a dedicated appliance height above the respective base.

20 Claims, 7 Drawing Sheets

(56) References Cited

U.S. PATENT DOCUMENTS

| | | |
|---|---|---|
| 5,267,713 A | 12/1993 | Lewis |
| 6,012,185 A | 1/2000 | Woods et al. |
| 6,575,414 B2 | 6/2003 | Cuzzocrea |
| 6,892,991 B1 | 5/2005 | Soh |
| 7,252,276 B2 | 8/2007 | Acketts |
| 7,681,847 B2 | 3/2010 | Levin |
| 8,262,054 B2 | 9/2012 | Stansbury |
| 9,835,284 B2 * | 12/2017 | Gandole ................. F16M 7/00 |

* cited by examiner

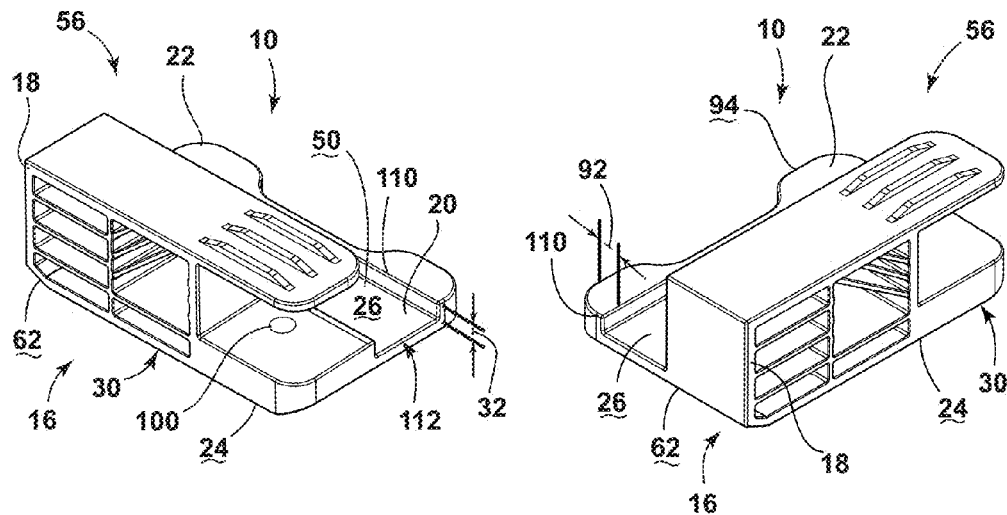
FIG. 2
FIG. 3
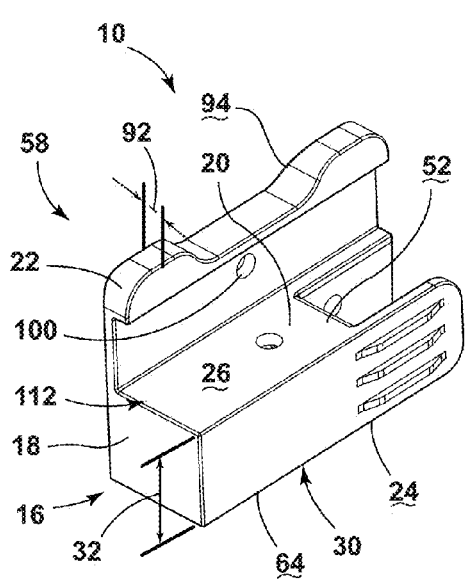
FIG. 4
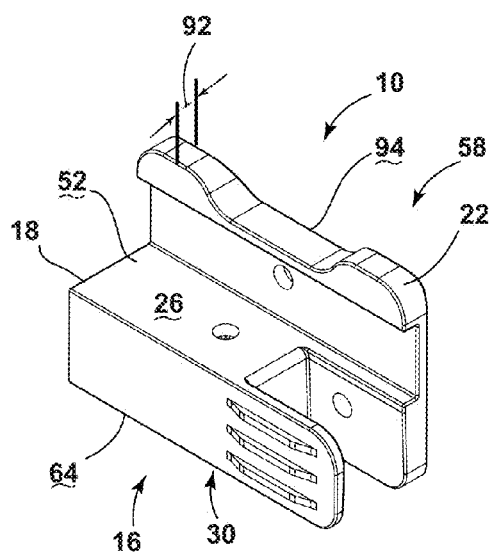
FIG. 5

MULTI-FACETED APPLIANCE HEIGHT-ADJUSTMENT MECHANISM

CROSS-REFERENCE TO RELATED APPLICATION

The present application is a divisional of U.S. patent application Ser. No. 14/617,400 filed Feb. 9, 2015, entitled MULTI-FACETED APPLIANCE HEIGHT-ADJUSTMENT MECHANISM, the entire disclosure of which is hereby incorporated herein by reference.

BACKGROUND

The present device is in the field of height-adjustment mechanisms for appliances, specifically, a multi-faceted appliance height-adjustment mechanism for adjusting the installation height of an appliance.

SUMMARY

In at least one aspect, an appliance height-adjustment mechanism includes a support block having a plurality of supporting faces. A plurality of height-adjustment surfaces is defined by at least a portion of the supporting faces of the support block. Each height-adjustment surface is further defined by a lateral spacing flange that extends perpendicularly from each height-adjustment surface. A plurality of support surfaces is defined by at least a portion of the plurality of supporting faces. Each support surface corresponds to a cooperating height-adjustment surface of the plurality of height-adjustment surfaces. The support block includes a plurality of support positions. Each of the plurality of support positions is defined by one of the support surfaces being a respective base of the support block and the corresponding height-adjustment surface defines a dedicated appliance height above the respective base.

In at least another aspect, an appliance height-adjustment mechanism includes a plurality of height-adjustment surfaces. Each of the height-adjustment surfaces defines a dedicated appliance height and includes a lateral spacing flange extending perpendicularly from each height-adjustment surface. Each height-adjustment surface is configured to receive a bottom of an appliance and position the bottom of the appliance at any one of the dedicated appliance heights. A plurality of support surfaces are included, wherein each support surface corresponds to a cooperating height-adjustment surface of the plurality of height-adjustment surfaces. Each support surface and corresponding height-adjustment surface defines one of the dedicated appliance heights, wherein the dedicated appliance height is defined by the perpendicular distance between one of the support surfaces and the cooperating height-adjustment surface. Each dedicated appliance height is different with respect to each support surface and cooperating height-adjustment surface.

In at least another aspect, a method for adjusting the height of an appliance includes providing a height-adjustment mechanism having a plurality of height-adjustment surfaces and a plurality of support surfaces, wherein each height-adjustment surface includes a lateral spacing flange extending perpendicularly from each height-adjustment surface wherein each support surface corresponds to a cooperating height-adjustment surface of the plurality of height-adjustment surfaces to define a dedicated appliance height with respect to each support surface and cooperating height-adjustment surface. An appliance is provided having a bottom, wherein the appliance is configured to be installed in a predetermined position. One of the support surfaces and the cooperating height-adjustment surface is selected that corresponds to one of the dedicated appliance heights. The height-adjustment mechanism is placed in the predetermined position with the selected support surface defining the base of the height-adjustment mechanism. The bottom of the appliance is placed on the cooperating height-adjustment surface to position the bottom of the appliance at the dedicated appliance height, wherein the lateral spacing flange of the cooperating height-adjustment surface spaces the appliance a minimum distance from an adjacent object. The minimum distance is substantially similar to the thickness of the lateral spacing flange.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 2 is a front top perspective view of the multi-faceted height-adjustment mechanism placed in a first support position;

FIG. 3 is a rear top perspective view of the multi-faceted height-adjustment mechanism of FIG. 2;

FIG. 4 is a top perspective view of the multi-faceted height-adjustment mechanism of FIG. 2 placed in a second support position;

FIG. 5 is a top perspective view of the multi-faceted height-adjustment mechanism of FIG. 4;

DETAILED DESCRIPTION OF EMBODIMENTS

Figure 1:
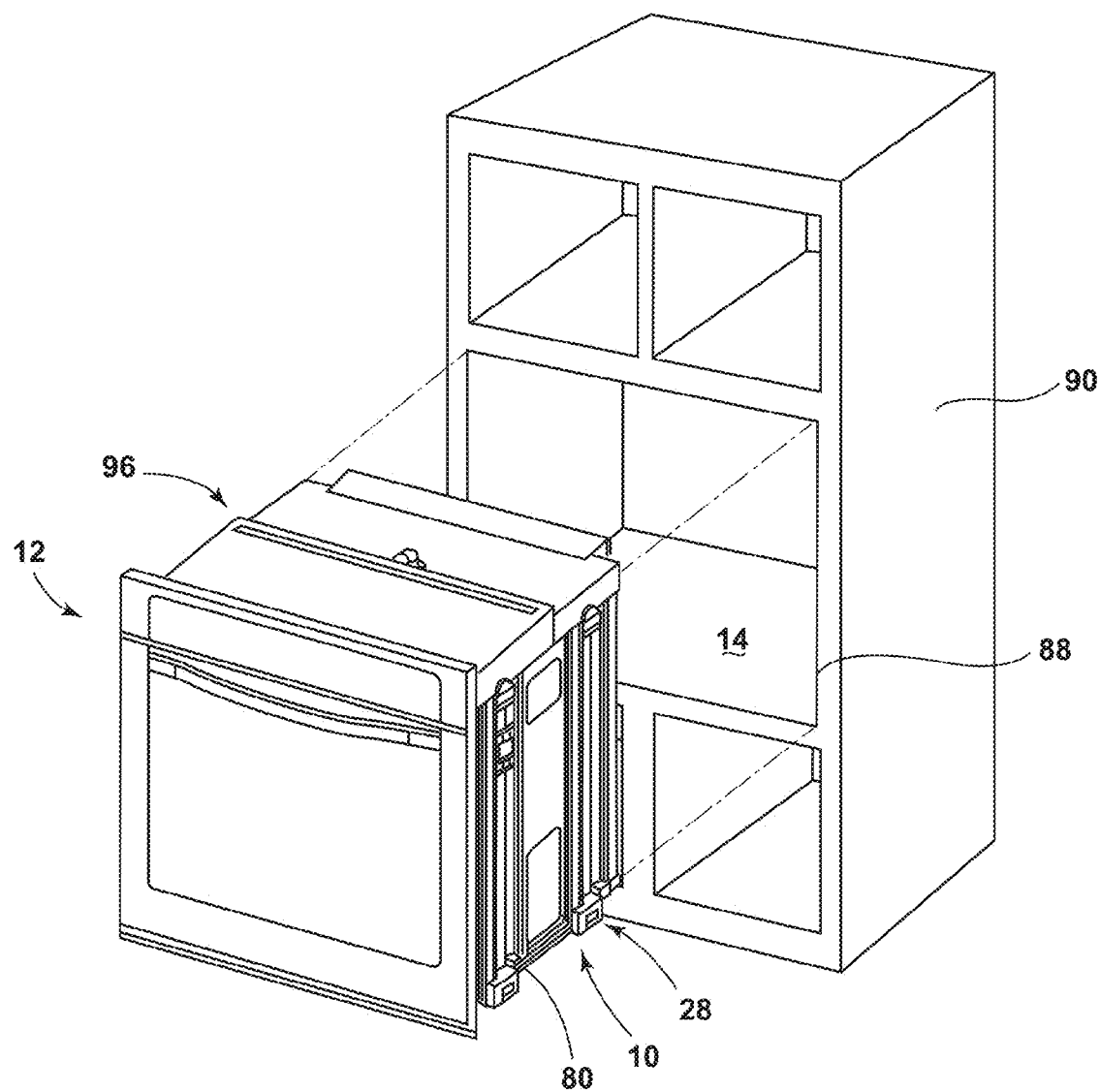
FIG. 1 is a partially exploded top perspective view of a cooking appliance resting upon an embodiment of the multi-faceted height-adjustment mechanism, with the appliance removed from the supporting substrate.
Figure 6:
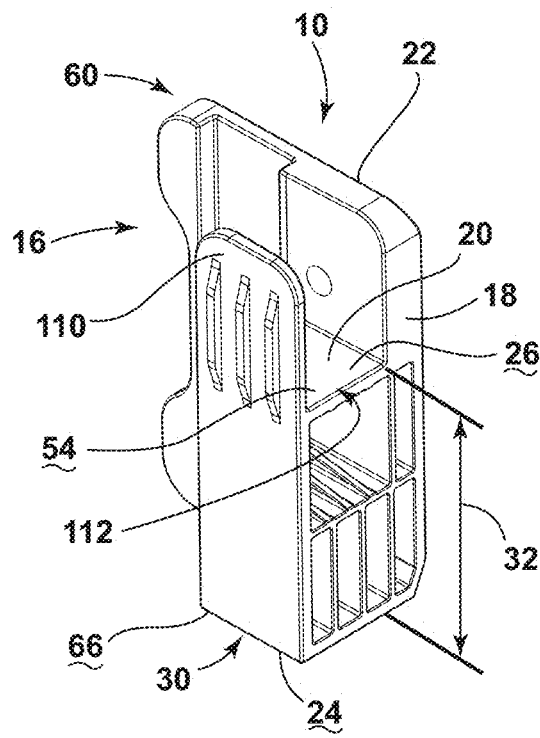
FIG. 6 is a top perspective view of the multi-faceted height-adjustment mechanism of FIG. 2 placed in a third support position.
Figure 7:
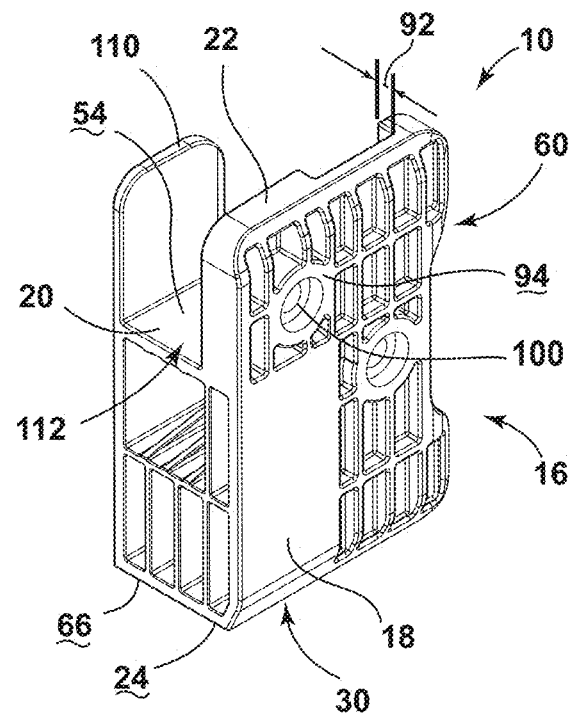
FIG. 7 is a top perspective view of the multi-faceted height-adjustment mechanism of FIG. 6.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-7, reference numeral 10 generally refers to a height-adjustment mechanism having a multi-faceted configuration that is used in conjunction with an appliance 12 to modify the installation height of an appliance 12 relative to a supporting substrate 14, such as a floor or cabinet top surface. The appliance height-adjustment mechanism 10 can include a support block 16 having a plurality of support faces 18. The plurality of height-adjustment surfaces 20 is defined by at least a portion of the support faces 18 of the support block 16. Each height-adjustment surface 20 is further defined by a lateral spacing flange 22 that extends perpendicularly from each height-adjustment surface 20. A plurality of support surfaces 24 is defined by at least a portion of the plurality of support faces 18, wherein each support surface 24 corresponds to a cooperating height-adjustment surface 26 of the plurality of height-adjustment surfaces 20. The support block 16 can include a plurality of support positions 28, wherein each of the plurality of support positions 28 is defined by one of the support surfaces 24 being a respective base 30 of the support block 16 and the corresponding height-adjustment surface 20 defining a dedicated appliance height 32 above the respective base 30. According to various embodiments, it is contemplated that the plurality of height-adjustment surfaces 20 can include first, second and third height-adjustment surfaces 50, 52, 54 corresponding to respective first, second and third support positions 56, 58, 60 of the support block 16. Additionally, the plurality of support surfaces 24 can include first, second and third support surfaces 62, 64, 66 that correspond to the first, second and third height-adjustment surfaces 50, 52, 54, respectively. In turn, the first, second and third support positions 56, 58, 60 of the support block 16 can correspond to three different, respective appliance heights of the dedicated appliance heights 32. It is also contemplated that the first support surface 62 can be positioned substantially parallel to the first height-adjustment surface 50 and the second support surface 64 can be substantially parallel to the second height-adjustment surface 52. Similarly, it is contemplated that the third support surface 66 can be substantially parallel to the third height-adjustment surface 54. According to the various embodiments, it is contemplated that the support block 16 can include more than three support surfaces 24 and more than three cooperating height-adjustment surfaces 26.

Referring again to FIGS. 1-7, the appliance height-adjustment mechanism 10 can include several support positions 28, where each support position 28 includes one of the support surfaces 24 acting as the respective base 30 of the support block 16 and the cooperating height-adjustment surface 26 that corresponds to the respective base 30 is positioned at a dedicated appliance height 32 above the base 30. In this manner, when an appliance 12 is placed upon the height-adjustment mechanism 10, the bottom of the appliance 12 engages the cooperating height-adjustment surface 26 that is positioned substantially parallel with the supporting substrate 14. The cooperating height-adjustment surface 26 then supports the appliance 12 at the dedicated appliance height 32 to raise the appliance 12 above the supporting substrate 14 by a distance substantially equal to the dedicated appliance height 32. Where different appliance heights are required, the height-adjustment mechanism 10 can be manipulated to place one of the other support surfaces 24 as the respective base 30 of the support block 16, such that a different height-adjustment surface 20 that acts as the cooperating height-adjustment surface 26 is placed parallel with the supporting substrate 14 to define a different dedicated appliance height 32. In this manner, an appliance 12 can be installed within a kitchen setting within a residence or other similar structure and the height of the appliance 12 above the supporting substrate 14 can be adjusted to correspond to the surrounding setting, such as cabinetry, countertops, walls, and other various kitchen and/or residential fixtures.

According to the various embodiments, the support block 16 illustrated in FIGS. 1-11 includes a substantially cuboidal prism shape having approximately six sides, with the six sides defining three separate support positions 28. It is also contemplated that the support block 16 can include additional facets, such that the height-adjustment mechanism 10 can include more than three support positions 28 with four or more support surfaces 24 and cooperating height-adjustment surfaces 26. Where additional support positions 28 are included, it is contemplated that the support block 16 will have more than six sides. Typically, the number of sides of the support block 16 will be an even number to account for a corresponding respective base 30 and cooperating height-adjustment surface 26 for each support position 28. Generally, the support faces 18 of the support block 16 will be configured such that each corresponding respective base 30 and cooperating height-adjustment surface 26 will be parallel with one another, or substantially parallel with respect to each support position 28.

Referring again to FIGS. 1-11, the lateral spacing flange 22 that extends perpendicularly from each height-adjustment surface 20 can be used to space the appliance 12 apart from an adjacent object 90, such as a cabinet aperture 88 within a cabinet, a base cabinet, wall, or other fixture or structure. Accordingly, it is contemplated that the spacing provided by each lateral spacing flange 22 can be substantially the same regardless of the support position 28 of the height-adjustment mechanism 10 used to support the appliance 12 at any one of the dedicated appliance heights 32. As such, it is contemplated that each lateral spacing flange 22 can have a substantially similar thickness, such that when the support block 16 is in any one of the support positions 28, the lateral spacing flange 22 defines a minimum spacing width 92 between each height-adjustment surface 20 and the outside surface 94 of each respective lateral spacing flange 22. In this manner, it is contemplated that the minimum spacing width 92 for each lateral spacing flange 22 is substantially the same as to each support position 28.

Figure 8:
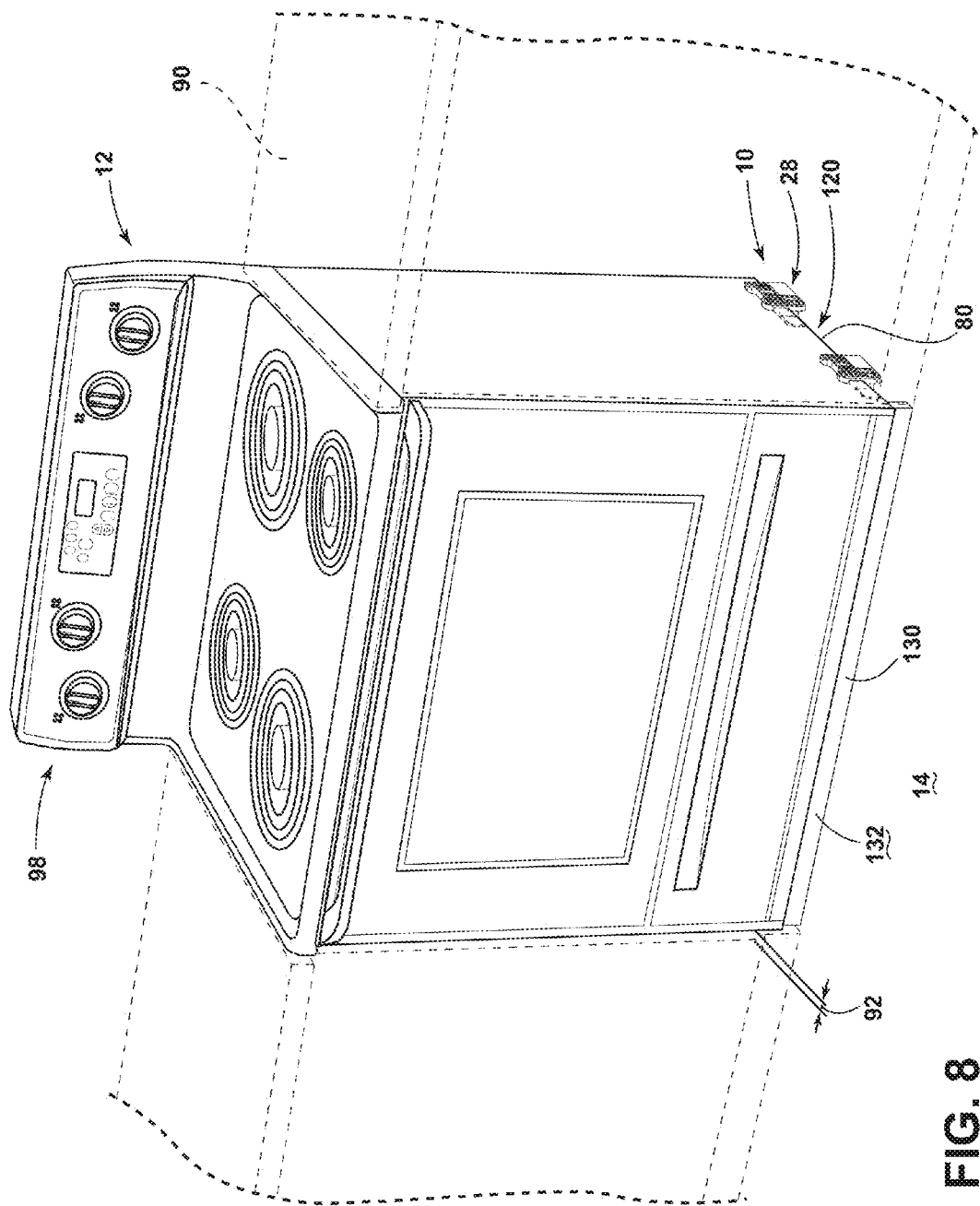
FIG. 8 is a top perspective view of another appliance resting upon the multi-faceted height adjustment mechanism.
Figure 9:
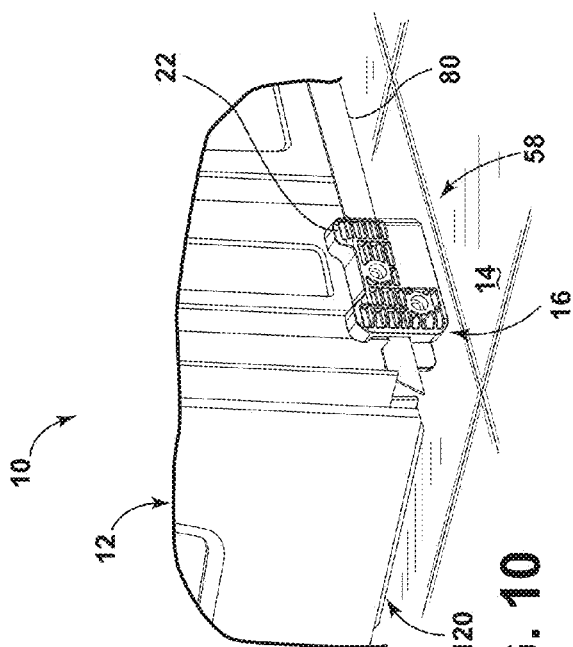
FIG. 9 is an enlarged top perspective view of a multi-faceted height-adjustment mechanism in a first supporting position supporting an appliance.
Figure 10:
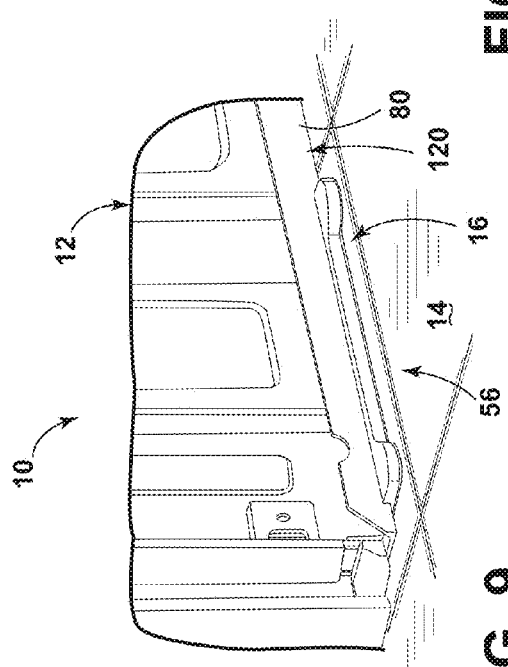
FIG. 10 is an enlarged top perspective view of the multi-faceted height adjustment mechanism of FIG. 9 supporting the appliance in the second supporting position.
Figure 11:
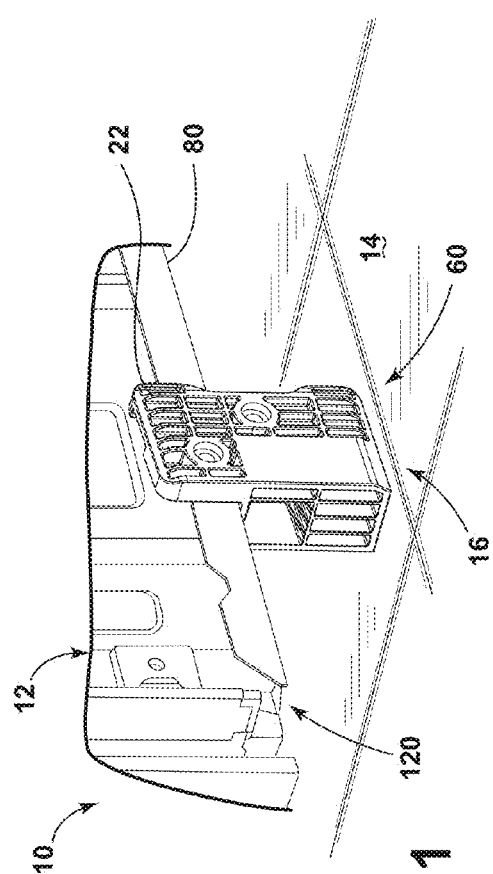
FIG. 11 is an enlarged top perspective view of the multi-faceted height adjustment mechanism of FIG. 9 supporting an appliance in the third supporting position.
Figure 13:
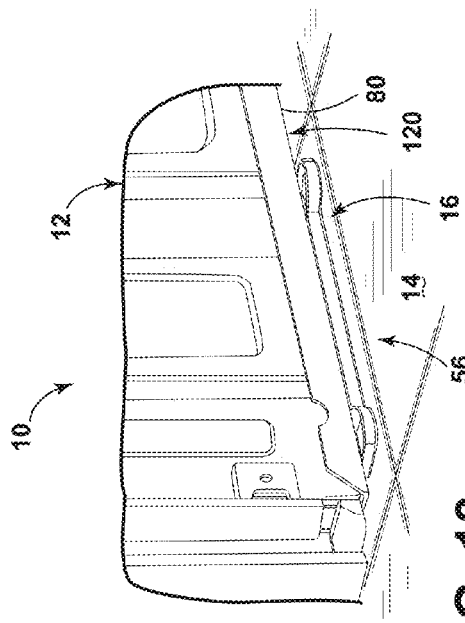
FIG. 13 is an enlarged perspective view of the spacer plate supporting an appliance.
Figure 15:
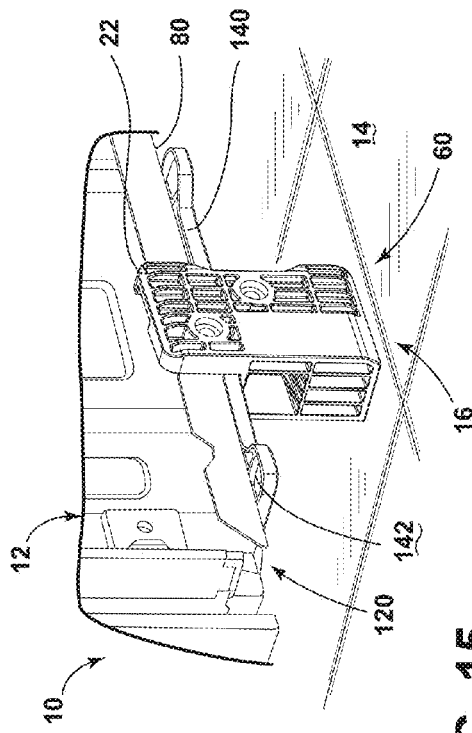
FIG. 15 is an enlarged top perspective view of the appliance and multi-faceted height-adjustment mechanism of FIG. 14, with the multi-faceted height-adjustment mechanism in a third supporting position and the spacer plate installed thereon.
Figure 12:
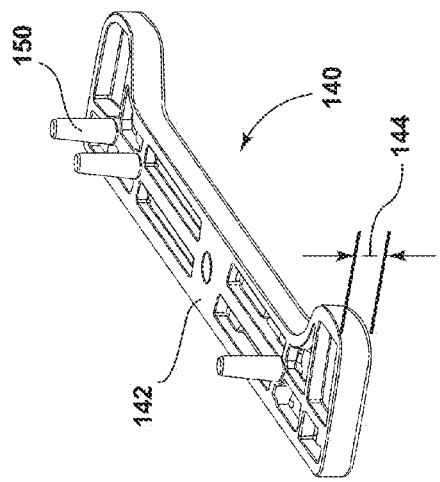
FIG. 12 is a top perspective view of a spacer plate for use with a multi-faceted height-adjustment mechanism of the present disclosure.
Figure 14:
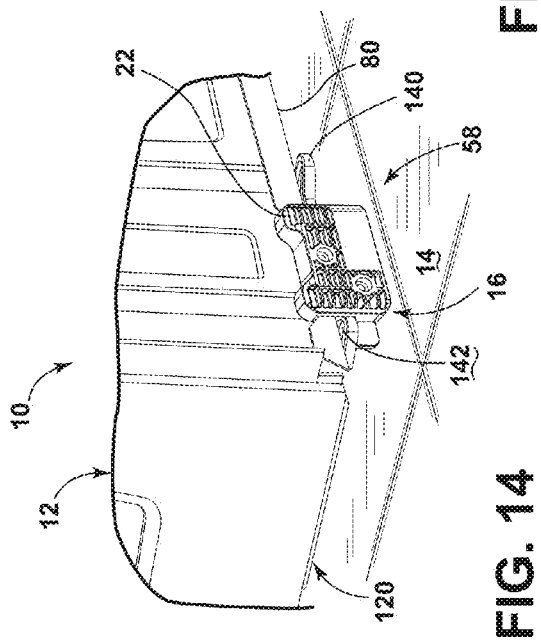
FIG. 14 is an enlarged top perspective view of the multi-faceted height-adjustment mechanism supporting an appliance, with the multi-faceted height-adjustment mechanism in a second supporting position, and the spacer plate installed on the cooperating height-adjustment surface.
Figure 16:
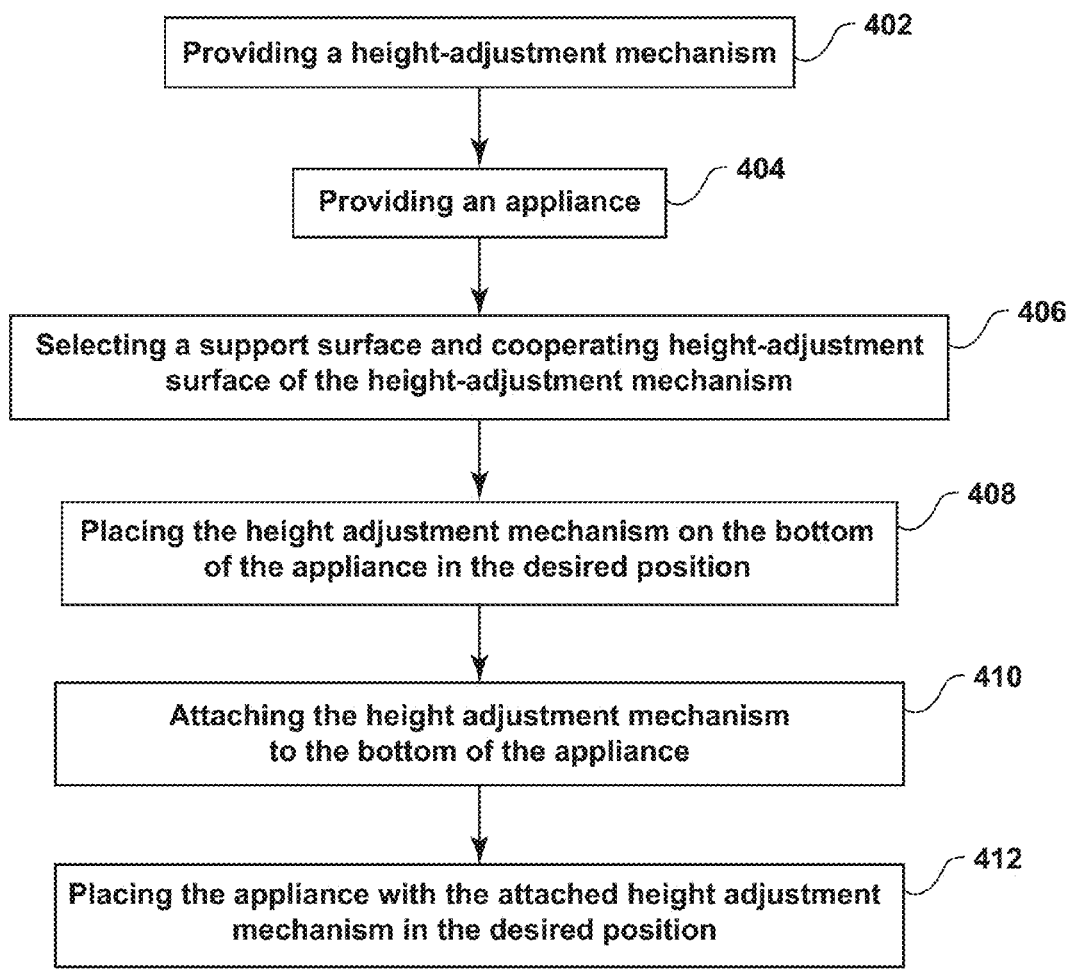
FIG. 16 is a schematic linear flow chart illustrating a method for adjusting the height of an appliance using an embodiment of the multi-faceted height-adjustment mechanism.

It is contemplated that the height-adjustment mechanism 10 can be used in conjunction with various appliances 12. By way of example, and not limitation, the height adjustment mechanism can be used to position a built-in oven 96 within a cabinet aperture 88 (as shown in FIG. 1). In such an embodiment, the various support blocks 16 of the height-adjustment mechanism 10 are placed in the appropriate support position 28. In this manner, the minimum spacing width 92 can be achieved at each edge of the built-in oven 96 relative to the cabinet aperture 88. Accordingly, the height-adjustment mechanism 10 can provide for minute adjustment of the vertical and lateral positioning of the built-in oven 96 within the cabinet aperture 88. Alternatively, the height-adjustment mechanism 10 can also be used to adjust the vertical and lateral spacing of a stand-alone oven 98 relative to an adjacent object, as shown in FIG. 8.

Referring again to FIGS. 1-11, it is contemplated that each lateral spacing flange 22 can include a fastening aperture 100 through which a fastener can be installed such that the lateral spacing flange 22 can be attached directly to a portion of the appliance 12. In this manner, the height-adjustment mechanism 10 can be fastened or otherwise attached to the appliance 12 with the height-adjustment mechanism 10 in the desired support position 28. The appliance 12 can then be maneuvered across the floor 14 of the structure with the appliance 12 positioned at the dedicated appliance height 32 above the supporting substrate 14. According to the various embodiments, it is contemplated that the height-adjustment mechanism 10 can include four individual support blocks 16, each having substantially the same support positions 28 and substantially the same dedicated appliance heights 32.

Referring again to FIGS. 2-7, it is contemplated that each height-adjustment surface 20 can be defined by a respective lateral spacing flange 22 that extends perpendicularly from the corresponding height-adjustment surface 20. It is also contemplated that one or more of the height-adjustment surfaces 20 can be defined by a respective lateral alignment wall 110 that is configured to substantially oppose the respective lateral spacing flange 22 of the height-adjustment surface 20. In such an embodiment, it is contemplated that each corresponding height-adjustment surface 20, lateral spacing flange 22 and lateral alignment wall 110 can cooperate to define a channel 112 that is configured to receive the bottom 80 of the appliance 12. Accordingly, it is contemplated that each support position 28 places the bottom 80 of the appliance 12 at a different dedicated appliance height 32 within a corresponding channel 112 for each support position 28.

According to the various embodiments, it is contemplated that one or more of the height-adjustment surfaces 20 can include both the lateral spacing flange 22 and the lateral alignment wall 110. It is contemplated that the space between the lateral spacing flange 22 and the lateral alignment wall 110 can be substantially similar to the thickness of the bottom 80 of the appliance 12. In this manner, the bottom 80 of the appliance 12 can slide into the channel 112 defined between the lateral spacing flange 22 and the lateral alignment wall 110 and rest upon the corresponding height-adjustment surface 20. The channel 112 of the height-adjustment surface 20 can substantially retain the bottom 80 of the appliance 12 relative to the height-adjustment mechanism 10 to prevent inadvertent release of the bottom 80 of the appliance 12 from the dedicated appliance height 32.

According to the various embodiments, it is contemplated that the support block 16 of the height-adjustment mechanism 10 can be made of various materials that can include, but are not limited to, metal, plastic, polymers, ceramic, rubber, combinations thereof, and other similar materials. It is also contemplated that in the various embodiments of the height-adjustment mechanism 10, the support block 16 can be made of a material that is substantially smooth such that the height-adjustment mechanism 10 with the appliance 12 bearing thereon can be easily moved along the supporting substrate 14 to be positioned as desired by the user without resulting in substantial scratching, marring or other damage to the supporting substrate 14. In such an embodiment, it is contemplated that the height-adjustment mechanism 10 can include a substrate fixing feature that can be used to receive an attachment mechanism that can substantially fix the support block 16 of the height-adjustment mechanism 10 in the desired support position 28 and also in the desired location upon the supporting substrate 14 such that the appliance 12 is not substantially subject to inadvertent movement along portions of the supporting substrate 14 during use.

According to the various embodiments, it is also contemplated that the height-adjustment mechanism 10 can be used to raise an appliance 12 to a dedicated appliance height 32 in order to provide an interstitial space 120 beneath the appliance 12 for running various utility fixtures that can include, but are not limited to, electrical wiring, plumbing, ductwork, and other various fixtures.

According to the various embodiments, it is contemplated that an accessory faceplate 130 can be configured to accompany the various embodiments of the height-adjustment mechanism 10 disposed herein. According to the various embodiments, the accessory faceplate 130 can be configured to be multi-faceted, such that manipulation of the accessory faceplate 130 can expose a dedicated plate surface 132 having a height that substantially corresponds to each of the support positions 28 of the height-adjustment mechanism 10. In this manner, when the appliance 12 is elevated to the dedicated appliance height 32, the open space beneath the appliance 12 created as a result of elevating the appliance 12 can be substantially concealed through the use of the accessory faceplate 130.

Referring now to FIGS. 1 and 12-15, the height-adjustment mechanism 10 can include a spacer plate 140 that can be selectively positioned on any one of the height-adjustment surfaces 20. When the spacer plate 140 is positioned on any one of the height-adjustment surfaces 20, the spacer plate 140 defines an enlarged support surface 142 that corresponds to each support position 28 of the support block 16. It is also contemplated that the spacer plate 140 can be positioned on any one of the height-adjustment surfaces 20, such that the enlarged support surface 142 can be implemented in each of the support positions 28 of the height-adjustment mechanism 10. Additionally, when the spacer plate 140 is positioned on any one of the height-adjustment surfaces 20, the effective height of the dedicated appliance height 32 is increased by a predetermined value that is substantially similar to a plate thickness 144 of the spacer plate 140. Accordingly, it is contemplated that the spacer plate 140 can be used as a fine tuning feature to further adjust the height of the appliance 12 above the supporting substrate 14.

According to the various embodiments, it is contemplated that the dedicated appliance heights 32 provided by each of the height-adjustment surfaces 20 can be within the range of from approximately 4 millimeters to approximately 60 millimeters. By way of explanation, and not limitation, according to various embodiments, the first support position 56 can define a dedicated appliance height 32 of approximately 6 millimeters as set by the first height-adjustment surface 50. The second support position 58 can define a dedicated appliance height 32 of approximately 24 millimeters as set by the second height-adjustment surface 52. Additionally, the third support position 60 can define a dedicated appliance height 32 of approximately 51 millimeters as set by the third height-adjustment surface 54. Where different dedicated appliance heights 32 are required, the spacer plate 140 can be implemented to further elevate the appliance 12 above the supporting substrate 14.

According to the various embodiments, the spacer plate 140 can have a plate thickness 144 of within the range of from approximately 4 millimeters to approximately 10 millimeters. By way of explanation, and not limitation, it is contemplated that in various embodiments, the spacer plate 140 can have a plate thickness 144 of approximately 6 millimeters. In such an embodiment, implementation of the spacer plate 140 can increase the dedicated appliance height 32 by approximately 6 millimeters for each support position 28.

According to various embodiments, it is contemplated that the spacer plate 140 can have a plate thickness 144 that is less than the dedicated appliance height 32 of the first support position 56. In this manner, it is contemplated that the spacer plate 140 can be used by itself as a portion of the height-adjustment mechanism 10 to provide a fourth dedicated appliance height 32 that is defined by the spacer plate 140 being positioned under the bottom 80 of the appliance 12 to elevate the appliance 12 by the plate thickness 144 of the spacer plate 140. According to the various embodiments, it is contemplated that the spacer plate 140 can include one or more retaining tabs 150 that extend upward from the surface of the spacer plate 140. It is contemplated that the retaining tabs 150 are configured to engage the bottom 80 of the appliance 12 to substantially position the bottom 80 of the appliance 12 at one of the dedicated appliance heights 32 as increased by the thickness of the spacer plate 140. In such an embodiment, the retaining tabs 150 can be configured to engage with a portion at the bottom 80 of the appliance 12 to substantially prevent inadvertent slippage or other movement of the appliance 12 with respect to the height-adjustment mechanism 10.

According to various embodiments, it is also contemplated that the spacer plate 140 can include one or more downward lugs that can be configured to engage one of the height-adjustment surfaces 20. In such an embodiment, when the user desires to use the spacer plate 140, the downward lugs of the spacer plate 140 can engage a lug receptacle defined within one or more of the height-adjustment surfaces 20 such that the engagement of the downward lugs with the lug receptacle can be configured to substantially retain the spacer plate 140 within the channel 112 defined between the lateral spacing flange 22 and the respective lateral alignment wall 110 for the cooperating height-adjustment surface 26.

Referring again to FIGS. 1-11, the height-adjustment mechanism 10 can include the various height-adjustment surfaces 20, where each of the height-adjustment surfaces 20 defines the various dedicated appliance heights 32. The various height-adjustment surfaces 20 can also include the lateral spacing flanges 22 that extend perpendicularly from each height-adjustment surface 20. Each height-adjustment surface 20 is configured to receive the bottom 80 of the appliance 12 and position the bottom 80 of the appliance 12 in any one of the dedicated appliance heights 32. The height-adjustment mechanism 10 can also include the plurality of support surfaces 24, where each support surface 24 corresponds to a cooperating height-adjustment surface 26. Additionally, each support surface 24 and corresponding height-adjustment surface 20 collectively defines one of the dedicated appliance heights 32. It is contemplated that the dedicated appliance height 32 can be defined by the perpendicular distance between one of the support surfaces 24 and the cooperating height-adjustment surface 26. It is also contemplated that each dedicated appliance height 32 is different with respect to each support surface 24 and cooperating height-adjustment surface 26.

Referring now to the various embodiments illustrated in FIGS. 1-16, having described various embodiments of the height-adjustment mechanism 10, a method 400 is disclosed for adjusting the height of an appliance 12 using at least one embodiment of the height-adjustment mechanism 10. According to the method 400, a height-adjustment mechanism 10 is provided, where the height-adjustment mechanism 10 includes a plurality of height-adjustment surfaces 20 and a plurality of support surfaces 24. Each height-adjustment surface 20 can include the lateral spacing flange 22 that extends perpendicularly from each height-adjustment surface 20. It is also contemplated that each support surface 24 can correspond to cooperating height-adjustment surface 26 that includes one of the plurality of height-adjustment surfaces 20. In this manner, each support surface 24 and the cooperating height-adjustment surface 26 define a dedicated appliance height 32 with respect to each support surface 24 and cooperating height-adjustment surface 26 (step 402).

Referring again to FIGS. 1-16, an appliance 12 is also provided, where the appliance 12 includes a bottom 80 that is configured to be received by one of the corresponding height-adjustment surfaces 20. It is contemplated that the appliance 12 is configured to be installed in a predetermined position (step 404). The predetermined position can be on the supporting substrate 14 of a residential structure, such as within a cabinet aperture 88 for receiving a built-in oven 96, a gap within a base cabinet for receiving a stand-alone oven 98, various other areas of a kitchen, kitchenette, or other similar area where an appliance 12 might be needed. In addition to residential structures, it is also contemplated that the height-adjustment mechanism 10 can be used to adjust the height of appliances 12 in commercial, institutional, and other similar structures. It is further contemplated that the height-adjustment mechanism 10 can be used for a variety of appliances 12 that can include, but are not limited to, single ovens, double ovens, stoves, refrigerators, dishwashers, trash compactors, water heaters, furnaces and other similar appliances 12. It is also contemplated that the height-adjustment mechanism 10 can be used to adjust the height of fixtures other than appliances, such as in adjusting the height of cabinetry, millwork, furniture, seating, and other similar fixtures.

Referring again to FIGS. 1-16, once the height-adjustment mechanism 10 and the appliance 12 have been provided, the user selects one of the support surfaces 24 and the cooperating height-adjustment surface 26 that corresponds to a support position 28 having one of the dedicated appliance heights 32 (step 406). The selection of the support position 28 can be dependent upon the desired dedicated appliance height 32 that the user wants the particular appliance 12 to be placed relative to the supporting substrate 14. Other factors that may be considered by the user in selecting the support position 28 can include, but are not limited to, an amount of interstitial space 120 needed below the appliance 12, the type of appliance 12 or fixture to be elevated, the conditions of the supporting substrate 14, and other various considerations.

According to the various embodiments, it is contemplated that in certain circumstances, the same support position 28 may not be wanted for each of the support blocks 16 of the height-adjustment mechanism 10. In situations where a supporting substrate 14 may be uneven, the appliance 12 can be leveled through the use of the various support blocks 16 of the height-adjustment mechanism 10 to include a different support position 28 at various portions of the bottom 80 of the appliance 12 to utilize the various dedicated appliance heights 32 available through use of the height-adjustment mechanism 10. Additionally, the spacer plate 140 may be used in conjunction with a portion of the support blocks 16, but not others. These various differing configurations of the support blocks 16 of the height-adjustment mechanism 10 can be used to substantially level an appliance 12 or other fixture relative to an irregularly configured or uneven supporting substrate 14.

Referring again to FIGS. 1-16, once the user has indicated the selected support surface 24 and corresponding support position 28, the height-adjustment mechanism 10 can be placed in a predetermined position on the bottom 80 of the appliance 12 with the selected support position 28 defining the respective base 30 of the height-adjustment mechanism 10 (step 408). Once the height-adjustment mechanisms 10 are positioned on the bottom 80 of the appliance 12, the support blocks 16 in the respective support positions 28 can be attached to the bottom 80 of the appliance 12 (step 410). With the height adjustment mechanism 10 installed, the bottom 80 of the appliance 12 can be positioned at the dedicated appliance height 32 and installed on the supporting substrate 14 in the desired position (step 412). Additionally, the lateral spacing flange 22 of the cooperating height-adjustment surface 26 spaces the appliance 12 at least the minimum spacing width 92 from an adjacent object 90, such as the cabinet aperture 88, base cabinet, wall, or other structure or fixture. It is contemplated that the minimum spacing width 92 that the appliance 12 is spaced from the adjacent object 90 can be approximately the thickness of the lateral spacing flange 22. In various embodiments, the channel 112 defined by the lateral spacing flange 22 and the lateral alignment wall 110 can be wider than the bottom 80 of the appliance 12. In such an embodiment, the bottom 80 of the appliance 12 may be afforded some play or limited lateral movement within the channel 112 as the appliance 12 is positioned upon the cooperating height-adjustment surface 26.

Referring again to FIGS. 12-16, it is contemplated that the step 406 of selecting one of the support surfaces 24 can include deciding whether to include the spacer plate 140 on the cooperating height-adjustment surface 26 in order to increase the dedicated appliance height 32 by the spacer thickness of the spacer plate 140. As discussed above, the spacer plate 140 can be used to fine tune the dedicated appliance height 32 in order to provide a substantially precise height-adjustment mechanism 10 for properly locating the appliance 12 a specified distance above the floor 14.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for adjusting a height of an appliance, the method including steps of:
  providing a height-adjustment mechanism having a plurality of height-adjustment surfaces and a plurality of support surfaces, wherein each height-adjustment surface includes a lateral spacing flange extending from each height-adjustment surface, wherein each support surface corresponds to a cooperating height-adjustment surface of the plurality of height-adjustment surfaces to define a dedicated appliance height with respect to each support surface and cooperating height-adjustment surface;

selecting one of the support surfaces that defines a selected support surface and corresponds to one of the dedicated appliance heights;

placing the height-adjustment mechanism on a bottom of the appliance with the selected support surface engaging the bottom of the appliance, wherein the selected support surface defines a base of the height-adjustment mechanism;

attaching the height-adjustment mechanism to the bottom of the appliance; and placing the appliance in a predetermined position, wherein the cooperating height-adjustment surface positions the bottom of the appliance at the dedicated appliance height, and wherein the lateral spacing flange of the cooperating height-adjustment surface spaces the appliance at least a minimum spacing width from an adjacent object, the minimum spacing width being substantially a thickness of the lateral spacing flange.

2. The method of claim 1, wherein the step of selecting one of the support surfaces includes selecting the cooperating height-adjustment surface of the plurality of height-adjustment surfaces, wherein the plurality of height-adjustment surfaces includes first, second and third height-adjustment surfaces.

3. The method of claim 2, wherein each of the first, second and third height-adjustment surfaces includes a respective dedicated appliance height within a range of from approximately 4 millimeters to approximately 60 millimeters, wherein the step of placing the appliance in the predetermined position includes adjusting the height of the appliance by the respective dedicated appliance height.

4. The method of claim 2, wherein the step of providing a height-adjustment mechanism includes locating the first height-adjustment surface to be positioned perpendicular with respect to the second height-adjustment surface, and locating the second height-adjustment surface to be positioned perpendicular with respect to the third height-adjustment surface.

5. The method of claim 1, wherein each height-adjustment surface is defined by the respective lateral spacing flange and a respective lateral alignment wall that opposes the respective lateral spacing flange, wherein the step of placing the height-adjustment mechanism includes placing a portion of the appliance between the respective lateral spacing flange and the respective lateral alignment wall.

6. The method of claim 5, wherein each corresponding height-adjustment surface, lateral spacing flange and lateral alignment wall cooperate to define a channel for selectively and alternatively receiving the bottom of the appliance.

7. The method of claim 6, further comprising a step of:
placing the bottom of the appliance at the dedicated appliance height, wherein each support position includes a different dedicated appliance height.

8. The method of claim 1, further comprising a step of:
locating the appliance a predetermined distance from the adjacent object wherein each lateral spacing flange extends perpendicularly from each cooperating height-adjustment surface to define the predetermined distance.

9. A method for adjusting a height of an appliance, the method including steps of:

selecting a height-adjustment surface of a plurality of height-adjustment surfaces of a support block to define a selected height-adjustment surface, wherein each height-adjustment surface includes a lateral spacing flange extending from each height-adjustment surface and corresponds to a dedicated appliance height of a plurality of dedicated appliance heights;

placing the selected height-adjustment surface at a bottom of the appliance, wherein the selected height-adjustment surface includes a respective support surface of a plurality of support surfaces, and wherein the respective support surface of the selected height-adjustment surface defines a base of the support block; and placing the appliance in a predetermined position, wherein the selected height-adjustment surface positions the bottom of the appliance at the dedicated appliance height, and wherein a lateral spacing flange of the selected height-adjustment surface spaces the appliance at least a minimum spacing width from an adjacent object, the minimum spacing width being substantially a thickness of the lateral spacing flange.

10. The method of claim 9, wherein the plurality of height-adjustment surfaces includes first, second and third height-adjustment surfaces corresponding to respective first, second and third support positions of the support block, wherein each support position corresponds to one of the dedicated appliance heights, wherein the step of selecting the height-adjustment surface includes selecting one of the first, second and third height-adjustment surfaces to be the selected height-adjustment surface.

11. The method of claim 10, wherein the step of selecting the height-adjustment surface includes selecting one of a first, second and third support surface that corresponds to the first, second and third height-adjustment surfaces, respectively.

12. The method of claim 11, wherein after the step of placing the selected height-adjustment surface at a bottom of the appliance, the first support surface is positioned perpendicular with the first height-adjustment surface and the second support surface is positioned perpendicular with the second height-adjustment surface.

13. The method of claim 10, wherein the step of selecting the height-adjustment surface includes selecting one of the first, second and third height-adjustment surfaces include dedicated appliance heights of within a range of from approximately 4 millimeters to approximately 60 millimeters.

14. The method of claim 10, wherein after the step of placing the selected height-adjustment surface at the bottom of the appliance, the first height-adjustment surface is positioned perpendicular with respect to the second height-adjustment surface, and wherein the second height-adjustment surface is positioned perpendicular with respect to the third height-adjustment surface, and the first, second and third height-adjustment surfaces are each perpendicular with the bottom of the appliance.

15. The method of claim 9, wherein each height-adjustment surface is defined by the respective lateral spacing flange and a respective lateral alignment wall that opposes the respective lateral spacing flange, and wherein each corresponding height-adjustment surface, lateral spacing flange and lateral alignment wall cooperate to define a channel configured to receive a bottom of the appliance, wherein the step of placing the selected height-adjustment surface at a bottom of the appliance includes placing the bottom of the appliance within the respective channel at the dedicated appliance height, and wherein each support position includes a different dedicated appliance height.

16. The method of claim 10, further comprising a step of:
affixing the support block to the bottom of the appliance via a respective fixing aperture wherein each of the first, second and third height-adjustment surfaces includes the respective fixing aperture that is configured to receive a fastener for engaging the support block to the bottom of the appliance in the respective support position of the support block.

17. The method of claim 16, wherein the step of selecting the height-adjustment surface includes selecting one of the first height-adjustment surface having a dedicated appliance height of approximately 6 millimeters, the second height-adjustment surface having a dedicated appliance height of approximately 24 millimeters, and the third height-adjustment surface having a dedicated appliance height of approximately 51 millimeters.

18. A method for adjusting a height of an appliance, the method including steps of:
providing a height-adjustment mechanism having a plurality of height-adjustment surfaces and a plurality of support surfaces, wherein each height-adjustment surface includes a lateral spacing flange extending from each height-adjustment surface, wherein each support surface corresponds to a cooperating height-adjustment surface of the plurality of height-adjustment surfaces to define a dedicated appliance height with respect to each support surface and cooperating height-adjustment surface;
selecting a support surface of the plurality of support surfaces to define a selected support surface;
placing the height-adjustment mechanism on a bottom of the appliance with the selected support surface engaging the bottom of the appliance, wherein the selected support surface defines a base of the height-adjustment mechanism; and
placing the appliance in a predetermined position, wherein the cooperating height-adjustment surface of the selected support surface positions the bottom of the appliance at the dedicated appliance height, and wherein the lateral spacing flange of the cooperating height-adjustment surface spaces the appliance at least a minimum spacing width from an adjacent object, the minimum spacing width being substantially a thickness of the lateral spacing flange.

19. The method of claim 18, wherein the plurality of height-adjustment surfaces includes first, second and third height-adjustment surfaces corresponding to respective first, second and third support positions of the height-adjustment mechanism, wherein the step of selecting the support surface includes selecting one of the first, second and third height-adjustment surfaces, respectively.

20. The method of claim 19, wherein after the step of placing the selected height-adjustment surface at the bottom of the appliance, the first height-adjustment surface is positioned perpendicular with respect to the second height-adjustment surface, and wherein the second height-adjustment surface is positioned perpendicular with respect to the third height-adjustment surface, and the first, second and third height-adjustment surfaces are each perpendicular with the bottom of the appliance.

* * * * *